(12) United States Patent
Grosbach et al.

(10) Patent No.: US 7,475,159 B2
(45) Date of Patent: Jan. 6, 2009

(54) HIGH-SPEED SCHEDULER

(75) Inventors: Lyle E. Grosbach, Rochester, MN (US); Glen H. Handlogten, Rochester, MN (US); James F. Mikos, Rochester, MN (US); David A. Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 10/670,704

(22) Filed: Sep. 25, 2003

(65) Prior Publication Data

US 2005/0071505 A1    Mar. 31, 2005

(51) Int. Cl.
*G06F 15/173* (2006.01)
*G06F 15/16* (2006.01)

(52) U.S. Cl. ............... 709/240; 709/238; 709/228; 709/217

(58) Field of Classification Search .......... 709/240, 709/224; 370/392, 486
See application file for complete search history.

(56) References Cited

U.S. PATENT DOCUMENTS 6,917,614 B1 * 7/2005 Laubach et al. ............. 370/392
2005/0027852 A1 * 2/2005 Tilander et al. ............. 709/224

* cited by examiner

*Primary Examiner*—Jude J Jean Gilles
(74) *Attorney, Agent, or Firm*—Dugan & Dugan

(57) ABSTRACT

In a first aspect, a method is provided for scheduling connections for a network processor. The method includes the steps of, in a cache, scheduling a plurality of connections to be serviced based on quality of service parameters stored in a control structure corresponding to each connection and during a scheduling opportunity (1) identifying one or more of the plurality of connections in the cache to be serviced; (2) selecting one of the connections identified to be serviced; (3) servicing the selected connection; (4) accessing one or more portions of the control structure in the cache; (5) calculating a next service time when the selected connection is to be serviced; and (6) determining whether to schedule the selected connection to be serviced in one of the cache and a calendar based on the next service time. Numerous other aspects are provided.

8 Claims, 6 Drawing Sheets

HIGH-SPEED SCHEDULER

FIELD OF THE INVENTION

The present invention relates generally to network processors, and more particularly to a high-speed scheduler and methods for using the same.

BACKGROUND

A network device, such as a switch or router, may include a network processor. The network processor often is employed for handling the transmission of data, such as cells or frames, from one or more connections into and out of the network device. The network device may store information in memory using one or more control structures (e.g., control blocks) corresponding to the connection from which data is transmitted into the network processor. The network processor may typically store 250,000 or more control structures in memory. Therefore, a large memory is needed to store the control structures. Due to the size limitations of the network processor, the large memory is generally external to the network processor.

One or more components of the network processor may modify information stored in the control structures. For example, every time the network processor receives a cell or frame from a connection, one or more components of the network processor may access the external memory to modify information stored in one or more control structures.

Due to limited memory bandwidth, external memory access may become a rate limiting step or bottleneck for the network processor. Because it is desirable to receive data in and/or transmit data from a network processor at speeds faster than an external memory access time, a need exists for methods and apparatus of providing high-speed scheduling of data for a network processor.

SUMMARY OF THE INVENTION

In a first aspect of the invention, a first method is provided for scheduling connections for a network processor. The first method includes the steps of, in a cache, scheduling a plurality of connections to be serviced based on quality of service parameters stored in a control structure corresponding to each connection, and during a scheduling opportunity (1) identifying one or more of the plurality of connections in the cache to be serviced; (2) selecting one of the connections identified to be serviced; (3) servicing the selected connection; (4) accessing one or more portions of the control structure, including the quality of service parameters, in the cache, the quality of service parameters corresponding to the selected connection; (5) calculating a next service time when the selected connection is to be serviced, the next service time being based on the quality of service parameters; and (6) determining whether to schedule the selected connection to be serviced in one of the cache and a calendar based on the next service time.

In a second aspect of the invention, a second method is provided for scheduling connections for a network processor. The second method includes the steps of, during a scheduling opportunity: (1) identifying one or more of a plurality of connections scheduled to be serviced in a cache memory based on one or more portions of a control structure corresponding to each of the plurality of connections; (2) servicing one of the identified connections; and (3) scheduling the serviced connection to be serviced again in one of the cache and a calendar based on the one or more portions of the control structure corresponding to the serviced connection. Numerous other aspects are provided, as are systems and apparatus in accordance with these other aspects of the invention.

Other features and aspects of the present invention will become more fully apparent from the following detailed description, the appended claims and the accompanying drawings.

DETAILED DESCRIPTION

In one or more embodiments of the invention, a network processor system may include a network processor that is coupled to one or more high-speed connections. The network processor may also include an output port coupled to an output connection. The network processor may receive data from the high-speed connection and transmit the data from the output connection via the output port. The network processor includes scheduler logic, for scheduling when data received by the network processor is transmitted from the output connection via the output port of the network processor.

In order to schedule the transmission of data received from a high-speed connection, the scheduler logic may access an external memory to retrieve information corresponding to the high-speed connection (e.g. a control structure). Because the scheduler logic must access the external memory using a bandwidth of a limited size, the speed of this memory access is limited. Such a speed limitation may pose a problem when the network processor system is coupled to one or more high-speed connections which require servicing. The present methods and apparatus provide high-speed scheduling of data received from high-speed connections by limiting the number of times an external memory is accessed for retrieving control structures while scheduling the high-speed connections to be serviced.

Figure 1:
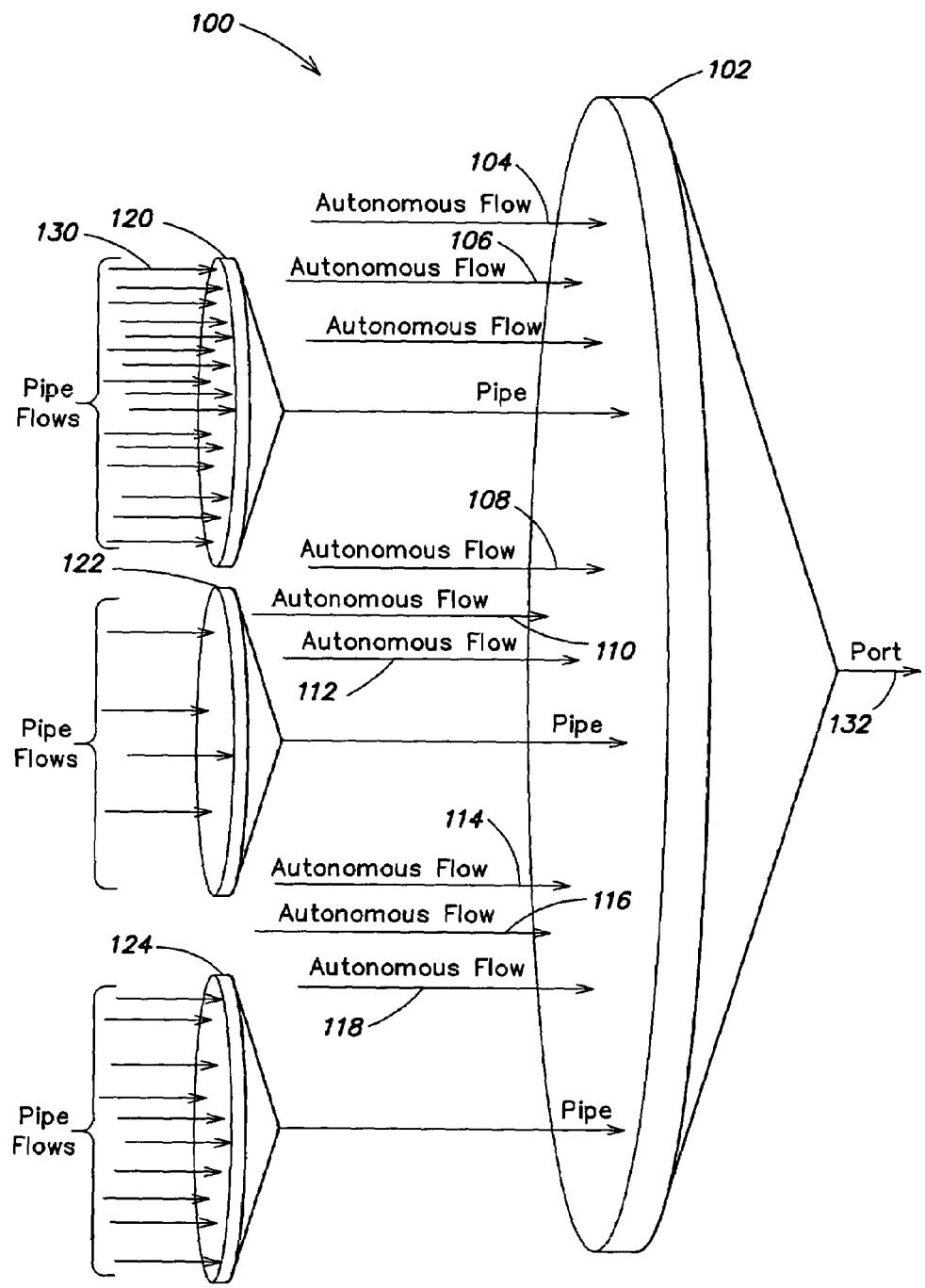
FIG. 1 is an exemplary schematic diagram of a network processor system in which the present invention may be implemented.

FIG. 1 is an exemplary schematic diagram of a network processor system 100 provided in accordance with the present invention. The network processor system 100 may include a network processor 102. The network processor 102 may receive data from autonomous flows 104-118 and/or pipes 120-124. Autonomous flows and pipes are peers. Each autonomous flow 104-118 represents an individual connection from the network processor 102 to a network device (not shown). Each pipe 120-124 may include one or more pipe flows 130. A pipe flow 130 represents an individual connection from the network processor 102 to a network device (not shown) that is grouped together with other individual connections to network devices in the pipe 120-124 (e.g., an Internet Service Provider may purchase a group of pipe flows from the owner of the system bandwidth, and sell the pipe flows to consumers).

In the network processor system 100 shown in FIG. 1, the network processor 102 receives data from a plurality of autonomous flows 104-118 and/or a plurality of pipes 120-124, which each include a plurality of pipe flows (e.g., 130), that is to be transmitted from an output port 132. Each output port 132 of the network processor 102 may be connected to a network connection of limited system bandwidth. Therefore, data from all autonomous flows 104-118 and pipes 120-124 may not be serviced at the same time (e.g., data from each autonomous flow and pipe may not be transmitted at the same time).

In the network processor 102 shown in FIG. 1, every autonomous flow 104-118 or pipe 120-124 may be assigned a priority, (e.g., high, medium, or low) and a bandwidth. The priority assigned to an autonomous flow 104-118 or pipe 120-124 determines how frequently the autonomous flow 104-118 or pipe 120-124 is serviced. The bandwidth assigned to the autonomous flow 104-118 or pipe 120-124 determines the portion of the system bandwidth made available to the autonomous flow 104-118 or pipe 120-124 when the autonomous flow or pipe is serviced.

Figure 2:
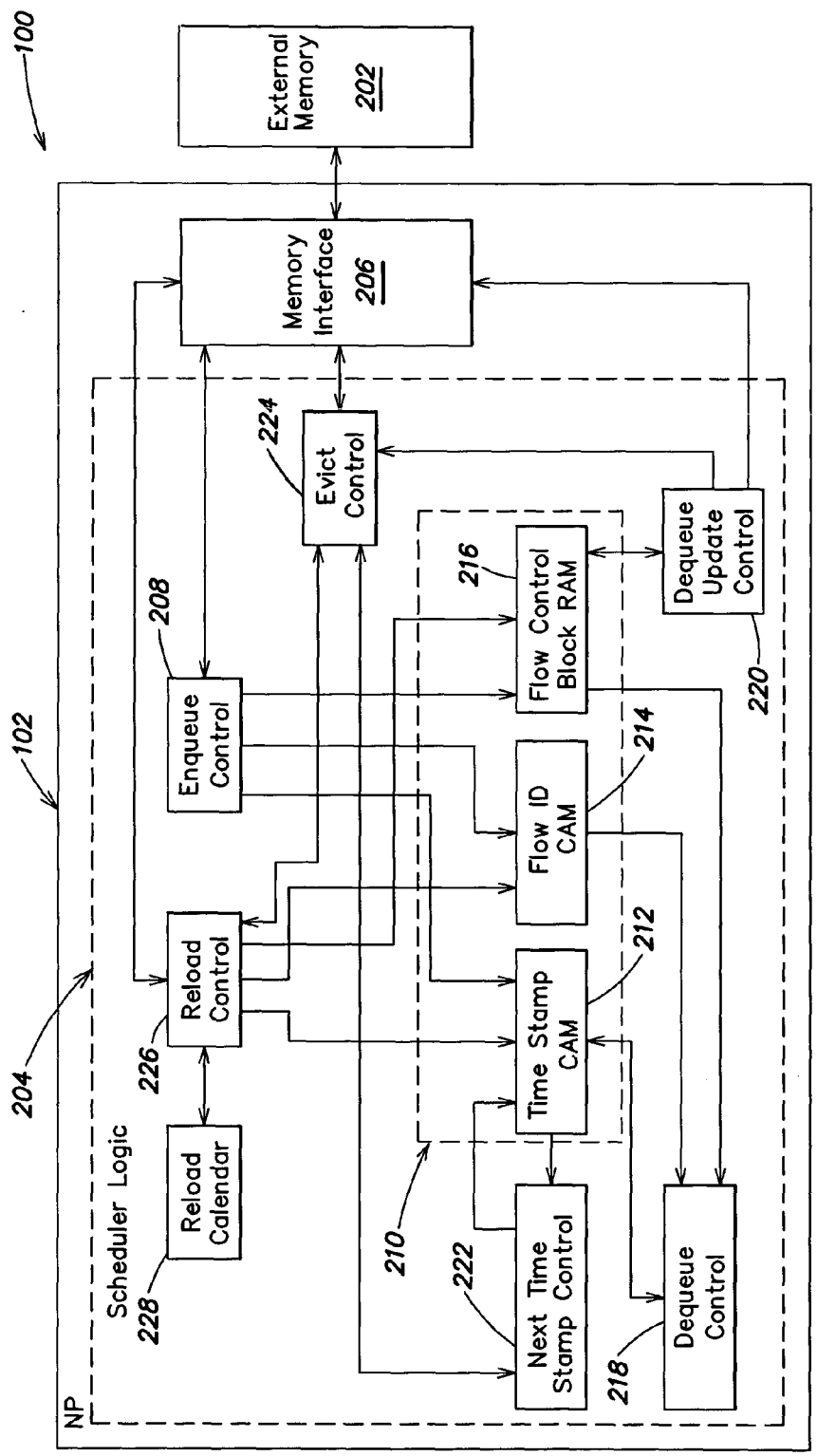
FIG. 2 is a detailed block diagram of an exemplary network processor system in accordance with the present invention.

FIG. 2 is a detailed block diagram of an exemplary network processor system 100 in accordance with the present invention. The network processor system 100 includes a network processor 102 coupled to a memory 202, such as an external memory. The network processor 102 may receive data via one or more of the connections described above and transmit data from a connection via one or more output ports 132 (FIG. 1). The memory 202 may store information in one or more control structures (e.g., control blocks) corresponding to each connection from which data is received by the network processor 102. The network processor 102 may include scheduler logic 204 coupled to the memory 202 via a memory interface 206, such as a memory controller, for example. The scheduler logic 204 may schedule to be serviced connections from which data is received by the network processor system 100 and/or service the connections. A connection is serviced when data received by the network processor 102 from the connection is transmitted from the network processor 102.

The scheduler logic 204 may include a cache memory 210 for storing information relating to connections to be serviced in the near future. More specifically, the cache memory 210 may store a control structure (e.g., a control block) corresponding to a connection to be serviced in the near future as an entry. Although the cache memory 210 stores a control structure corresponding to a connection to be serviced in the near future, for convenience, the cache memory 210 may be referred to as storing the connection herein. In one aspect, the cache memory 210 may include a time stamp contents addressable memory (CAM) 212, flow identification (id) CAM 214, and flow control block RAM 216. The time stamp CAM 212, flow id CAM 214, and flow control block RAM 216 may store one or more portions of each cache memory entry. Other configurations and/or memory types may be employed.

The scheduler logic 204 may include enqueue control logic 208 coupled to the cache memory 210 and the memory 202 (e.g., via the memory interface 206). Although control logic included in the scheduler logic 204 may be coupled to one or more of the time stamp CAM 212, flow id CAM 214, and flow control block RAM 216, for convenience, the control logic is referred to as being coupled to the cache memory 210. The enqueue control logic 208 may schedule to be serviced connections from which new data is received by the network processor system 100 using the cache memory 210.

Dequeue control logic 218 may be coupled to the cache memory 210. For a given scheduling opportunity, the dequeue control logic 218 may identify entries in the cache memory 210 that correspond to connections scheduled to be serviced during that scheduling opportunity and service one or more of the connections.

Dequeue update control logic 220 may be coupled to an output of the cache memory 210. The dequeue update control logic 220 may update one or more portions of the control block corresponding to the connection that was serviced during a scheduling opportunity. Next time stamp control logic 222 also may be coupled to an output of the cache memory 210. The next time stamp control logic 222 determines when the connection that was serviced during a scheduling opportunity should be scheduled to be serviced again. An output of each of the dequeue update control logic 220 and the next time stamp control logic 222 may be coupled to an input of the cache memory 210 and evict control logic 224.

Based on when the connection that was serviced during a scheduling opportunity is scheduled to be serviced again, the connection (e.g., the control block corresponding to the connection) that was just serviced is input to either the cache memory 210 or the evict control logic 224. If the connection that was just serviced needs to be scheduled to be serviced again in the near future, the connection is stored in the cache memory 210. Alternatively, if the connection that was just serviced will not be scheduled to be serviced again in the near future, the connection is output to the evict control logic 224.

The evict control logic 224 determines whether to output the control block corresponding to the connection that was just serviced to the memory (e.g., external memory) 202 or to reload control logic 226. If the connection that was just serviced no longer needs servicing (e.g., if the connection is empty), the control block corresponding to that connection is written to the memory 202. Alternatively, if the connection that was just serviced needs to be serviced again, but not in the near future, the control block corresponding to that connection is output to the reload control logic 226 (which is in turn coupled to a reload calendar 228).

The reload calendar 228 may include a group of memory addresses that are checked repeatedly for entries identifying connections that need to be serviced. When a group of memory addresses is checked repeatedly, a pointer, which points to a first memory address in the group during a first time unit, may be advanced during each successive time unit to point to a next memory address in the group. If the last address of the calendar is checked during the time unit, during the next time unit, the first address of the calendar may be checked. The greater the distance between the memory address of a scheduled entry in the reload calendar 228 and the memory address currently being checked in the reload calendar 228, the longer the connection identified by that scheduled entry must wait to be serviced.

Based on when the connection input to the reload logic 226 needs to be serviced again, the reload control logic 226 writes the control block corresponding to the connection to the reload calendar 228. The reload control logic 226 may access the reload calendar 228 to determine if one or more connections are scheduled to be serviced in the near future, may retrieve the control blocks corresponding to those connections from the memory 202, and may write those control blocks into the cache memory 210.

In addition to the functions described above, the evict control logic 224 may remove an entry from the cache memory 210 and schedule the entry to be serviced in the reload calendar 228 (e.g., via the reload control logic 226) to make room for an entry representing a connection that needs to be serviced before the removed entry (e.g., via the enqueue control logic 208 and/or the reload control logic 226).

Figure 3:
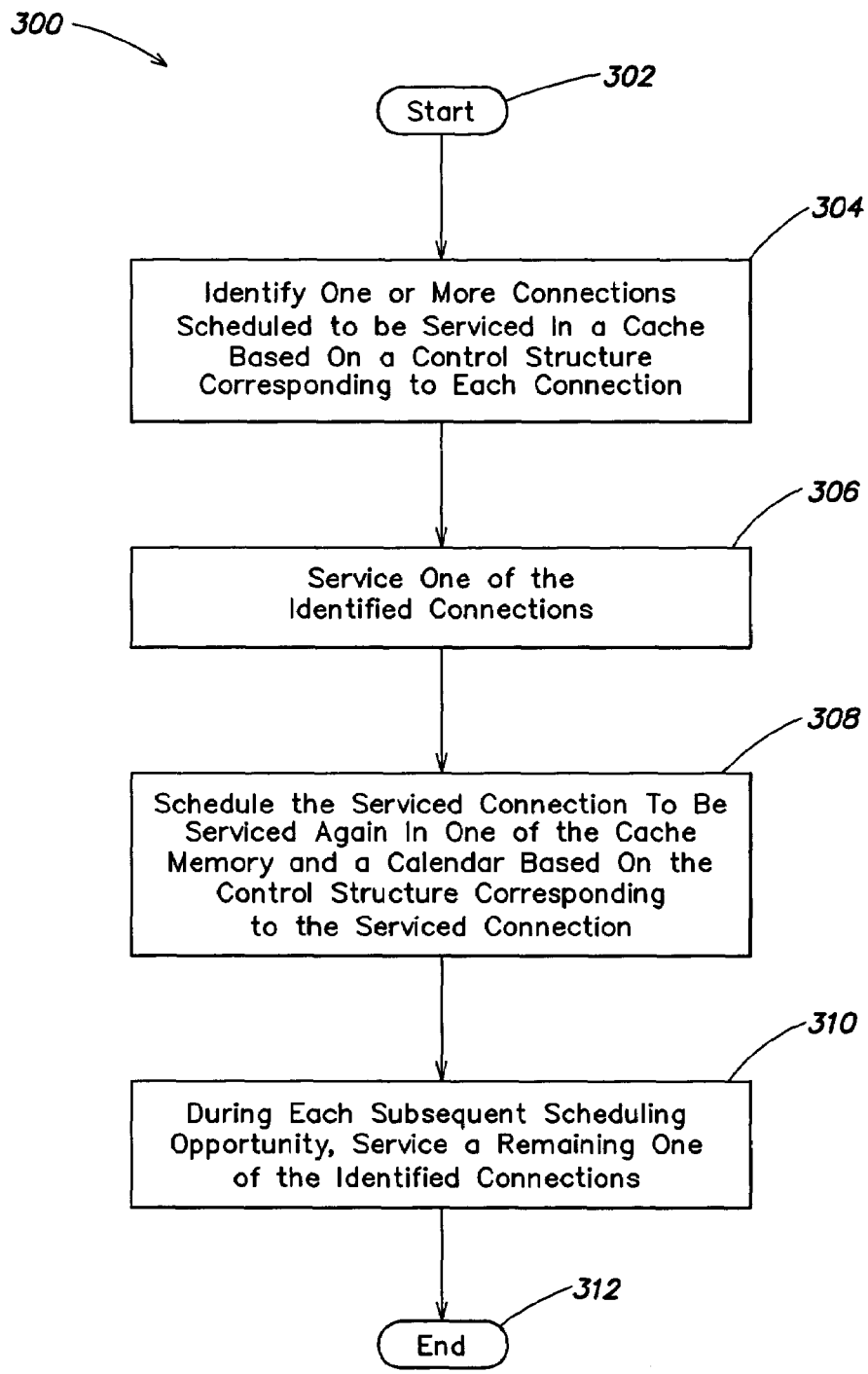
FIG. 3 illustrates an exemplary method of scheduling data in accordance with the present invention.

The operation of the network processor system 100 is now described with reference to FIGS. 1-2, and with reference to FIG. 3 which illustrates an exemplary method of scheduling data in accordance with the present invention. With reference to FIG. 3, in step 302, the method 300 begins. In step 304, one or more of a plurality of the connections scheduled for servicing in a cache memory 210 are identified to be serviced during a scheduling opportunity. The plurality of connections are identified for servicing based on one or more portions of a control structure corresponding to each of the plurality of connections. More specifically, each entry in the cache memory 210 may be a control block corresponding to a connection. Each control block may include a plurality of fields that describe the connection. The dequeue control logic 218 may employ a key to identify one or more of the plurality of the connections scheduled in the cache memory 210 for servicing. For example, when the dequeue control logic 218 inputs the key to the cache memory 210, the cache memory 210 will notify the dequeue control logic 218 of any control block entries including a portion that matches the key (e.g., of any hits).

In step 306, one of the identified connections is serviced during the scheduling opportunity. The dequeue control logic 218 arbitrarily selects one of the identified control block entries and services the connection corresponding to the selected control block entry, during the scheduling opportunity. More specifically, data from the connection corresponding to the selected control block entry is transmitted from network processor system 100, and one or more portions of the control block are updated via the dequeue update logic 220 and the next time stamp control logic 222.

In step 308, the serviced connection is scheduled to be serviced again in one of the cache memory and a calendar during the scheduling opportunity. The connection that was just serviced is scheduled to be serviced again in a location based on one or more portions of the control block corresponding to the connection. For example, the control block corresponding to the connection may include a field indicating when the connection should be serviced again. If the value of this field indicates the connection should be serviced in the near future (e.g., approximately less than a predetermined number of scheduling opportunities), the connection is scheduled to be serviced in the cache memory 210. Otherwise, the connection is scheduled to be serviced in the reload calendar 228.

As mentioned above, in step 304, the dequeue control logic 218 may identify one or more of the plurality of connections in the cache memory 210 for servicing during a scheduling opportunity. Assuming more than one of the plurality of connections is identified in step 304, in step 310, a remaining one of the identified connections is serviced during each subsequent scheduling opportunity, until all of the identified connections are serviced. More specifically, the dequeue control logic 218 arbitrarily selects one of the remaining control block entries, which are identified by the cache memory 210 in response to the key input by the dequeue control logic 218, and services the selected entry (as described above), during each a subsequent scheduling opportunity, until each of the remaining identified connections is serviced. In step 312, the method 300 of FIG. 3 ends.

Figure 4:
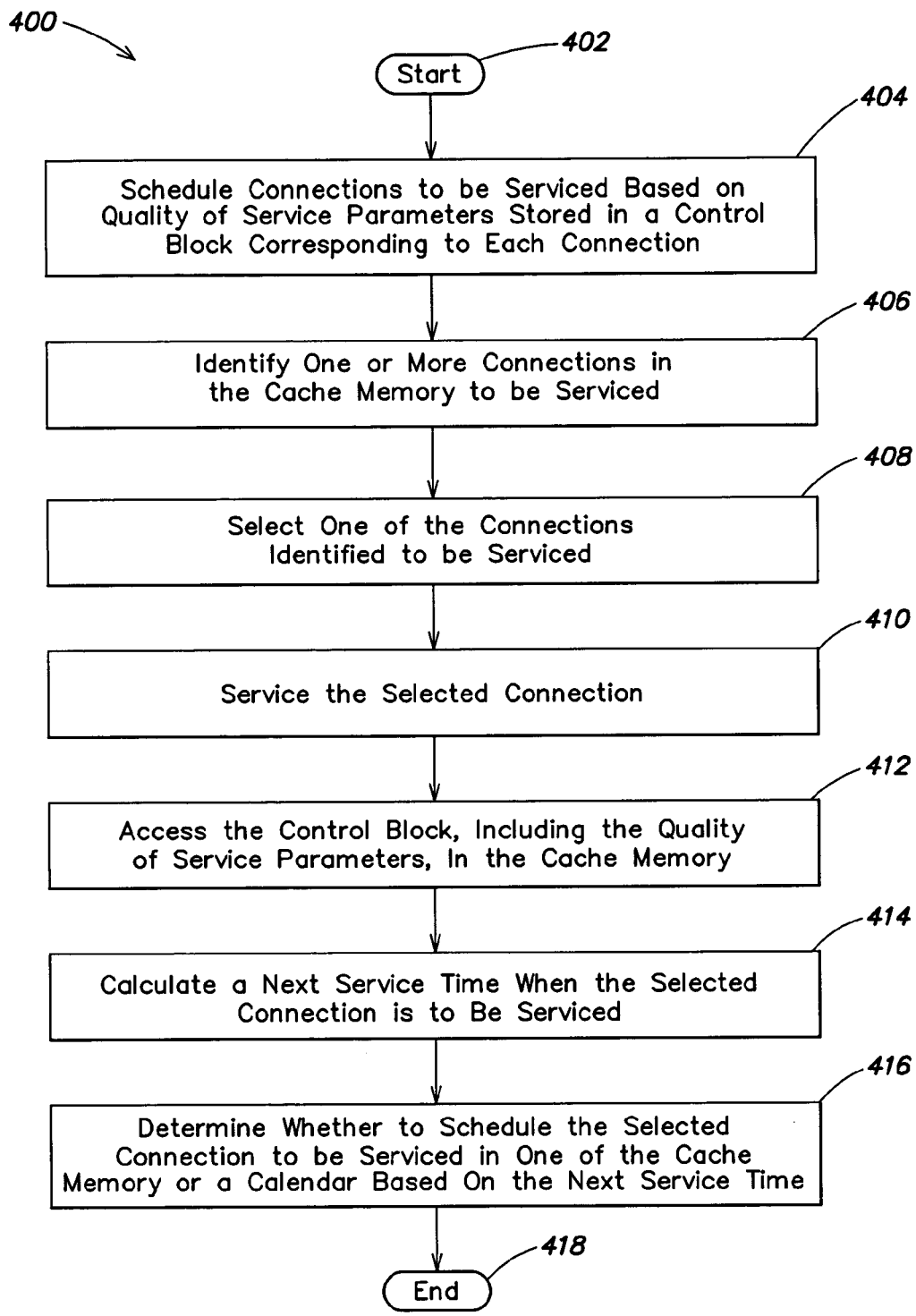
FIG. 4 illustrates a more detailed exemplary method of scheduling data in accordance with the present invention.

The operation of the network processor system 100 is described with reference to FIGS. 1-2 and with reference to FIG. 4, which illustrates a more detailed exemplary method 400 of scheduling data in accordance with the present invention. With reference to FIG. 4, in step 402, the method of scheduling data begins. In step 404, a plurality of connections may be scheduled to be serviced in a cache memory. The plurality of connections may be scheduled in the cache memory 210 based on quality of service parameters stored in a control block corresponding to each connection.

As mentioned earlier, when the scheduler logic 204 services a connection, the scheduler logic 204 accesses and modifies portions of the control block corresponding to the connection. If control blocks are stored by memory 202 (e.g., an external memory), an external memory access is performed every time a connection is serviced. Because bandwidth to the memory 202 is limited, the memory access may be time consuming. If the network processor system 100 accesses the external memory 202 every time a connection is serviced by the network processor 102, the speed of the connection from which the network processor 102 may receive data is limited by the memory access time. Therefore, storing control blocks that must be accessed in the near future locally in a cache memory 210 reduces the number of external memory accesses that are performed and allows high-speed scheduling of connections.

For example, each control block corresponding to a connection from which data is received by the network processor system 100 includes or is given a next time field value. The value of the next time field is based on the bandwidth assigned to the connection. The value of the next time field indicates when the connection needs to be serviced. If the next time is approximately less than a predetermined value (e.g., less than 2*Ds scheduling opportunities, where Ds is the number of entries in the cache), the connection is scheduled to be serviced in the cache memory 210. In one embodiment, the cache memory includes sixty-four entries. Consequently, if more than sixty-four connections include a next time that is less than the predetermined value, only sixty-four of the connections are stored in the cache memory 210. The cache memory 210 may store other numbers of entries.

The enqueue control logic 208, reload control logic 226, and the cache memory 210 may schedule a plurality of connections (e.g., a control block corresponding to the connection) to be serviced in the cache memory 210. The enqueue control logic 208 may retrieve from the memory 202 a control block corresponding to a connection from which new data is received by the network processor 102 and schedule that connection in the cache memory 210. The details of how the scheduler logic 204 (e.g., via the enqueue control logic 208) schedules a connection from which new data is received by the network processor 102 is described later with reference to FIG. 6. The reload control logic 226 may retrieve from the memory 202 a control block corresponding to connection scheduled in the reload calendar 228 and schedule the connection in the cache memory 210. The cache memory 210 may schedule a connection that was just serviced from the cache memory 210 to be serviced again in the cache memory 210.

In step 406, one or more of the plurality of the connections in the cache memory 210 is identified to be serviced during a scheduling opportunity. Step 406 is similar to step 304 described above. More specifically, the key input by the dequeue control logic 218 to the cache memory 210 may be a time value (e.g., a current pointer (curptr)), which indicates entries currently being serviced by the scheduler logic 204. The time value may be behind or equal to the current time. For example, when the dequeue control logic 218 inputs the current pointer to the cache memory 210, the cache memory 210 (e.g., the time stamp CAM 212 of the cache memory 210) will return to the dequeue control logic 218 the addresses of each control block entry in the cache memory 210 that includes a value (e.g., in the next time field) equal to the value of the current pointer. Each address returned by the cache memory 210 to the dequeue control logic 218 is considered to be a hit. Each hit represents a connection in the cache memory 210 scheduled to be serviced during the scheduling opportunity. Although one or more of the plurality of connections in the cache memory 210 may be identified to be serviced during the scheduling opportunity, for the remainder of this description of the method 400 of FIG. 4, it is assumed that a plurality of connections is identified to be serviced during the scheduling opportunity.

In step 408, one of the connections identified to be serviced is selected during the scheduling opportunity. More specifically, because all of the connections identified are scheduled to be serviced during the scheduling opportunity, the dequeue control logic 218 arbitrarily reads in one of the identified connections (e.g., one or more portions of a control block corresponding to the connection) from the cache memory 210.

In step 410, the selected connection is serviced during the scheduling opportunity. Data from the selected connection is transmitted from the network processor system 100. More specifically, the dequeue control logic 218 sends a portion (e.g., a head pointer) of the control block corresponding to the selected connection to a transmit interface (e.g., an output port) from which data is transmitted from the network processor system 100. The head pointer points to a first cell or frame in a queue of cells or frames received from the connection. During servicing, the first cell or frame (e.g., the cell or frame pointed to by the head pointer) is removed from the queue and transmitted from the network processor.

In step 412, one or more portions of the control block corresponding to the selected connection is accessed in the cache memory 210, during the scheduling opportunity. The dequeue update control logic 220 reads from the cache memory 210 and updates one or more portions of the control block corresponding to the connection that was just serviced. More specifically, the dequeue update control logic 220 modifies the head pointer and possibly the tail pointer of the control block corresponding to the connection that was just serviced. The tail pointer points to a last cell or frame in a queue of cells or frames received from the selected connection. The dequeue update control logic 220 may update one or more portions of the control block that stores statistics corresponding to the selected connection, such as the number of cells or frame remaining in the queue, or cells or frames received from the selected connection. The next time stamp control logic 222 may read in one or more portions (e.g., the next time field value) of the control block.

In step 414, a next service time when the selected connection is to be serviced is calculated, during the scheduling opportunity. The next service time may be based on the quality of service parameters (e.g., bandwidth parameters). More specifically, the next time stamp control logic 222 calculates the next service time for the connection that was just serviced by adding a value based on the quality of service parameters and the size of the cell or frame that was transmitted from the connection to the previous next service time of the connection. The next time stamp control logic 222 updates the control block corresponding to the connection that was just serviced with the newly calculated next service time during the scheduling opportunity.

After a selected connection is serviced, the selected connection may either include additional frames or cells to be transmitted from the connection or include no additional frames on cells to be transmitted from the connection (e.g., the selected connection is empty). Assuming the connection that was just serviced includes additional data to be transmitted from the network processor (e.g., the connection is not empty), in step 416, it is determined whether to schedule the selected connection to be serviced in one of the cache memory 210 and a calendar (e.g., a reload calendar 228) based on the next service time, during the scheduling opportunity. Step 416 is similar to step 308 described above. More specifically, the updated next service time for the connection that was just serviced is compared to the current pointer, which, as described above, represents a time value. If the difference between the updated next service time and the current pointer is approximately less than a predetermined value (e.g., 2*Ds scheduling opportunities, where Ds is the number of entries that may be stored the cache memory 210), the cache memory 210 (e.g., via the next time stamp control logic 222 and dequeue update control logic 220) schedules the selected connection to be serviced again in the cache memory 210. Alternatively, if the difference between the updated next service time and the current pointer is approximately greater than or equal to the predetermined value, the cache memory 210 (e.g., via the next time stamp control logic 222 and the dequeue update control logic 220) inputs the control block corresponding to the connection that was just serviced to the evict control logic 224. A larger or smaller predetermined value may be used. The evict control logic 224 writes the control block to the memory 202 and notifies the reload control logic 226 to schedule the connection to be serviced in the reload calendar 228 based on the next service time of the connection. As described above, the greater the distance between the memory address of a scheduled connection in the reload calendar 228 and a memory address currently being checked in the reload calendar 228, the longer the connection must wait to be serviced.

In step 418, the method 400 of FIG. 4 ends. Similar to step 310 of FIG. 3, after the method 400 is performed, during each subsequent scheduling opportunity, a remaining one of the connections identified to be serviced in the cache memory 210 may be serviced (as described in FIG. 3) until all of the identified connections have been serviced. More specifically, during each subsequent scheduling opportunity, steps 410 through 416 may be performed on the remaining one of the connections identified to be serviced in the cache memory 210 until all of the identified connections are serviced.

The operation of the network processor system 100 is now described with reference to FIGS. 1, 2, 4 and with reference to FIG. 5, which illustrates a method of servicing connections scheduled for servicing that includes steps 406 through 416 of the method shown in FIG. 4.

Servicing Connections Scheduled for Servicing

Figure 5:
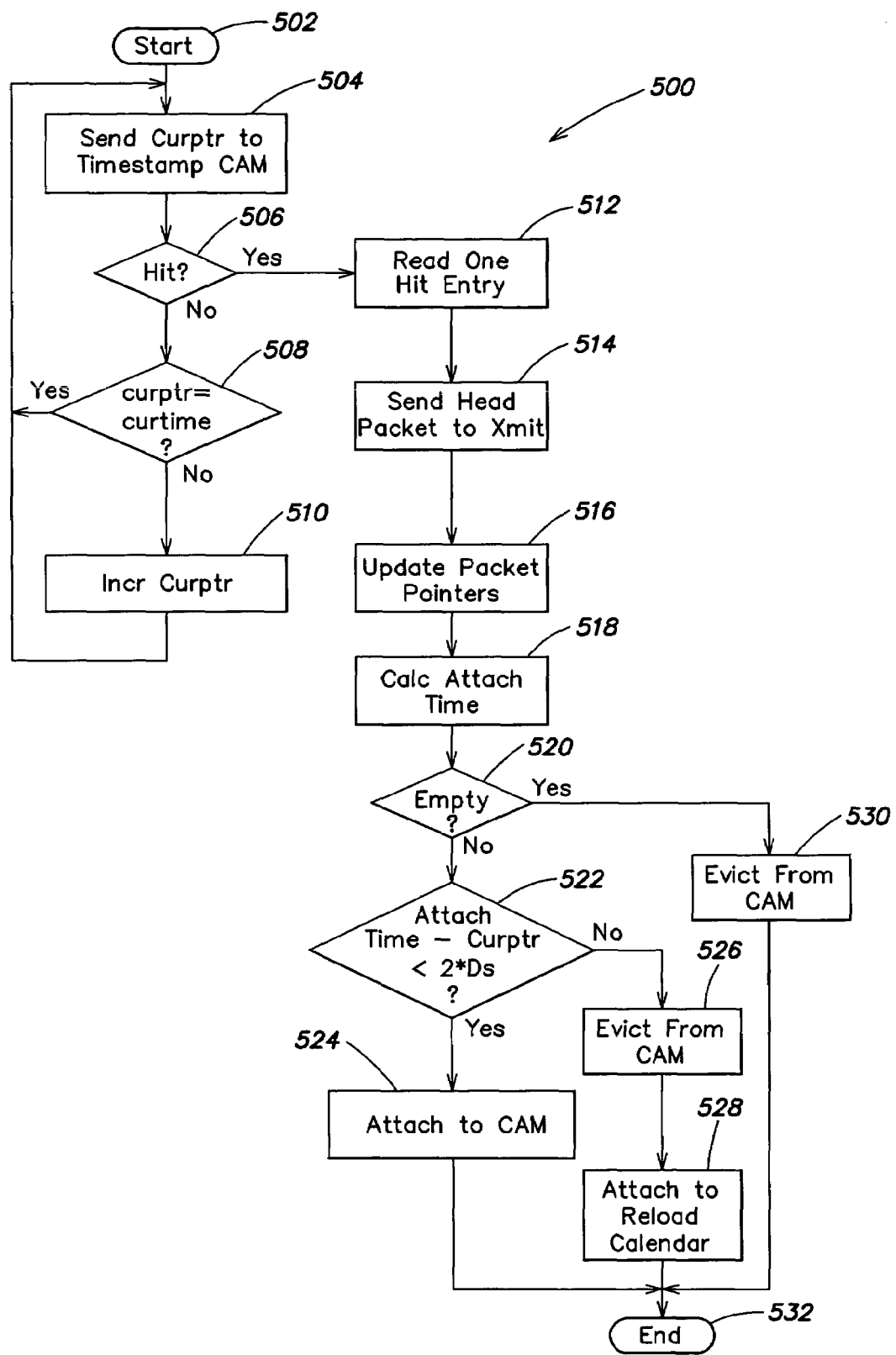
FIG. 5 illustrates an exemplary method of servicing connections scheduled for servicing in accordance with the present invention.

With reference to FIG. 5, in step 502, the method 500 begins. In steps 504 and 506, dequeue control logic 218 inputs a current pointer as a key to a cache memory 210 (e.g., a time stamp CAM 212 of the cache memory 210) and the cache memory 210 notifies the dequeue control logic 218 of any hits, respectively, as described in step 406 of FIG. 4. If the cache memory 210 returns a hit to the dequeue control logic 218 in step 506, step 512 is performed. In step 512, the dequeue control logic 218 reads in one of the hits (e.g., a control block corresponding to a connection scheduled to be serviced) from the cache memory 210 as described in step 408 of FIG. 4. In step 514, a pointer (e.g., a head pointer) to a first frame or cell in a queue of frames or cells received from the connection corresponding to the hit is transmitted to the transmit interface (e.g., an output port), as described in step 410 of FIG. 4. Therefore, in step 514, the connection is serviced. In step 516, one or more portions (e.g., pointers) of the control block corresponding to the connection may be updated, as described in step 412 of FIG. 4. In step 518, an attach time (e.g., a next service time) is calculated for the connection serviced in step 514, as described in step 414 of FIG. 4.

In step 520, it is determined whether the connection that was just serviced is now empty (e.g., the connection does not include any data to be transmitted). For example, the dequeue update control logic 220 may access one or more portions (e.g., a count field) of the control block corresponding to the connection to determine whether the connection is empty. If the connection is determined to be empty in step 520, step 530 is performed. In step 530, the connection (e.g., the control block corresponding to the connection) is evicted from the cache memory 210. More specifically, the cache memory 210 (e.g., via the next time stamp control logic 222 and the dequeue update control logic 220) outputs the connection to the evict control logic 224. The evict control logic 224 writes the control block corresponding to the connection in the memory 202. Because the connection does not include any data to be transmitted, the connection does not need to be scheduled for servicing in the cache memory 210 or the reload calendar 228. Thereafter, step 532 is performed. In step 532, the method 500 of FIG. 5 ends.

Alternatively, if it is determined in step 520 that the connection that was just serviced is not empty (e.g., the connection that was just serviced includes data to be transmitted), step 522 is performed. In step 522, the attach time (e.g., a next service time) is compared to a current pointer, which represents a time value, as described in step 416 of FIG. 4. If the difference between the attach time and the current pointer is less than a predetermined value, step 524 is performed. In step 524, the connection that was just serviced is attached (e.g., scheduled to be serviced) to the cache memory 210 (e.g., to the time stamp CAM 212, and/or flow control block RAM 216) as described in step 416 of FIG. 4. Thereafter, step 532 is performed.

Alternatively, if the difference between the attach time and the current pointer is greater than or equal to the predetermined value, steps 526 and 528 are performed. In step 526 and 528, the connection is evicted from the cache memory 210, and attached to the reload calendar 228, respectively, as described in step 416 of FIG. 4. Thereafter, step 532 is performed, in which the method 500 of FIG. 5 ends.

However, if the cache memory 210 does not return a hit (e.g., no connections are identified to be serviced during the scheduling opportunity) to the dequeue control logic 218 in step 506, step 508 is performed. In step 508, it is determined whether the current pointer equals the current time. As mentioned above, the current pointer is a time value that may be equal to or behind the current time. If the current pointer does not equal the current time, step 510 is performed. In step 510, the current pointer is incremented by one scheduling opportunity. Thereafter, step 504 is performed using the updated current pointer. Alternatively, if it is determined that current pointer equals current time in step 508, step 504 is performed using the current pointer. The current pointer is not incremented because the current pointer may not be increased ahead of the current time.

Although the current time continues to increment, every time a hit is found in step 506 and consequently a connection scheduled for servicing is serviced, the current pointer does not increment. Therefore, if multiple hits (e.g., connections) are found for an input current pointer during a given a scheduling opportunity, during each subsequent scheduling opportunity one of the remaining multiple hits are serviced until all of the hits for the input current pointer are serviced. During the scheduling opportunities in which the multiple hits are serviced, the current pointer falls behind the current time, because the current pointer is not incremented. During the next scheduling opportunity in which a hit is not found, steps 508 and 510 are performed, and the current pointer is incremented.

The operation of the network processor system 100 is now described with reference to FIGS. 1, 2, 4 and with reference to FIG. 6, which illustrates a method of scheduling connections for servicing via enqueue control logic 208 that includes step 404 of the method shown in FIG. 4.

Scheduling Connections for Servicing via Enqueue Control Logic

Figure 6:
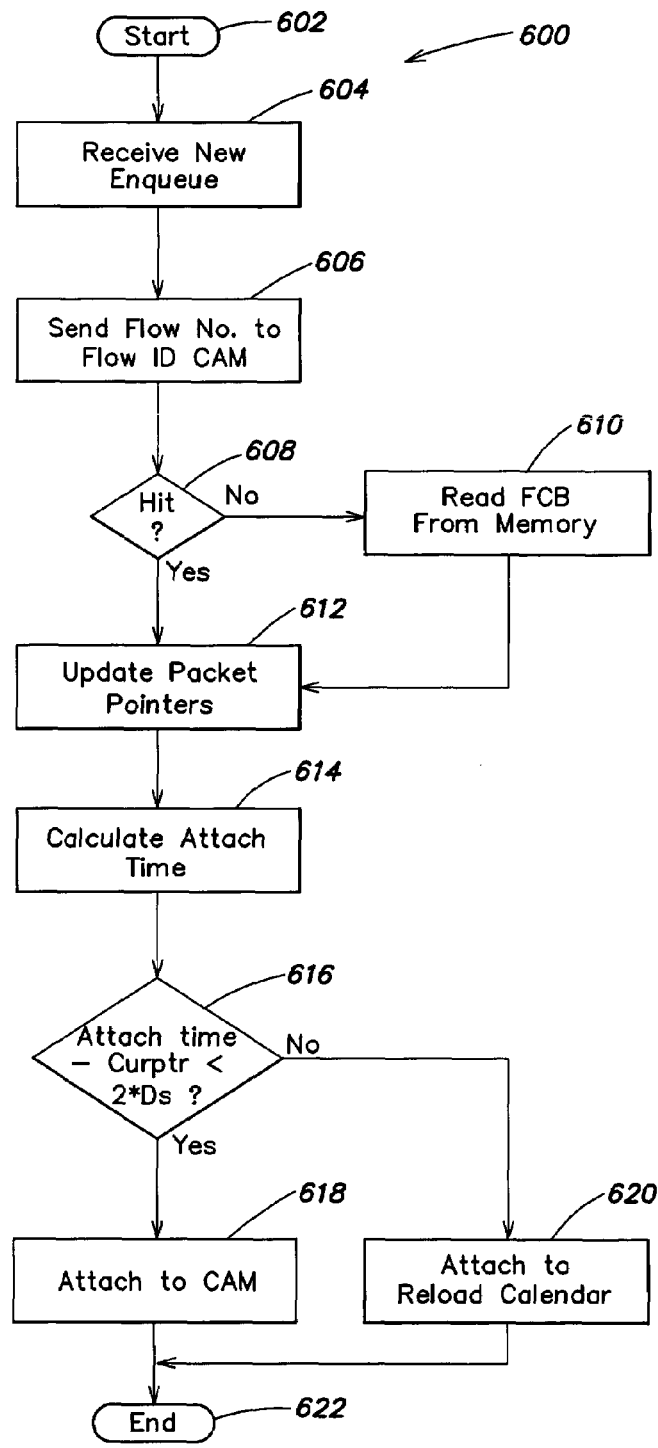
FIG. 6 illustrates an exemplary method of scheduling connections for servicing in accordance with the present invention.

With reference to FIG. 6, in step 602, the method 600 begins. In step 604, the scheduler logic 204 may receive data that includes a flow id, a frame or cell id, and a frame or cell size (e.g., a new enqueue request) in the enqueue control logic 208 during the scheduling opportunity. The flow id identifies a connection from which data is received by the network processor system 100. The frame or cell id and the frame or cell size correspond to the data received from the connection in the network processor system 100.

In step 606, the flow id is sent to the cache memory 210. More specifically, the enqueue control logic 208 inputs the flow id to the cache memory 210 (e.g., the flow id CAM 214 of the cache memory 210) as a key to determine whether a control block corresponding to the connection identified by the flow id is stored in the cache memory 210. The enqueue control logic 208 may access the control block corresponding to the connection to update portions of the control block to reflect the newly received frame or cell.

In step 608, it is determined whether a hit was found in the cache memory 210. For example, when the enqueue control logic 208 inputs the key (e.g., the flow id) to the cache memory 210, the cache memory 210 (e.g., the flow id CAM) notifies the enqueue control logic 208 of a control block entry that includes a portion that matches the key (e.g., of any hits). A hit indicates that the control block corresponding to the connection identified by the flow id is included in the cache memory 210. If a hit is found in step 608, step 612 is performed.

Alternatively, if a hit is not found in step 608, step 610 is performed. In step 610, the control block corresponding to the connection identified by the flow id is read from a memory 202. Because the control block corresponding to the connection is not stored in the cache memory 210, it is stored in the memory 202, which indicates the connection is either scheduled to be serviced in the reload calendar 228 or is not scheduled to be serviced. A connection is not scheduled to be serviced if the connection does not include data to be transmitted. More specifically, the enqueue control logic 208 retrieves (e.g., reads) the control block (e.g., a flow control block (FCB)) corresponding to the connection identified by the flow id from the memory 202 via the memory interface 206, for example. When reading the control block from the memory 202, the enqueue control logic 208 may wait for a data valid signal from the memory before it can retrieve the control block. The enqueue control logic 208 may then write the control block into the cache memory 210. Thereafter, step 612 is performed.

In step 612, one or more portions (e.g., pointers) of the control block are updated. More specifically, the enqueue control logic 208 may update the tail pointer (and possibly the head pointer) in the control block to reflect the new frame or cell received from the connection in the network processor system 100. The enqueue control logic 208 may update one or more portions of the control block that stores statistics corresponding to the connection, such as the number (e.g., a count field) of cells or frames in the queue of cells or frames received from the connection.

In step 614, an attach time (e.g., a next service time) is calculated for the connection identified by the flow id. More specifically, the enqueue control logic 208 may calculate the attach time (e.g., a next service time) to be included (e.g., assigned) in the control block corresponding to the connection from which the cell or frame is received. As described above, the next service time indicates when a connection is scheduled to be serviced and is based on the quality of service parameters (e.g., bandwidth parameters). The enqueue control logic 208 may update the control block corresponding to the connection from which data is received by the network processor 102 with the next service time. If the network processor receives data from a new connection, the enqueue control logic 208 calculates and assigns a next service time value for the connection that is sooner than a next service value that would be calculated and assigned to the same connection if data previously-received from the connection is scheduled for servicing.

In step 616, it is determined whether to schedule the connection from which data is received by the network processor 102 in one of the cache memory 210 and a reload calendar 228 based on the next service time. The enqueue control logic 208 performs a step similar to that performed by the next time stamp control logic 222 in steps 308 and 416 to schedule the connection to be serviced in either the cache memory 210 or the reload calendar 228. Because the enqueue control logic 208 previously writes the connection into the cache memory 210 (e.g., in step 610), in step 616, the enqueue control logic 208 determines whether the connection should remain in the cache memory 210 or be moved to the reload calendar 228. More specifically, the attach time (e.g., the next service) time is compared to a current pointer, which indicates a time value. Similar to step 522, if the difference between the attach time and current pointer is less than a predetermined value, step 618 is performed. Similar to step 524, in step 618, the connection from which data is received by the network processor 102 remains attached (e.g., scheduled to be serviced) to the cache memory 210. Thereafter, step 622 is performed, in which the method 600 of FIG. 6 ends.

Alternatively, if the difference between the attach time and the current pointer is greater than or equal to the predetermined value, step 620 is performed. Similar to step 528, in step 620, the connection from which data is received by the network processor 102 is attached to the reload calendar 228. More specifically, the enqueue control logic 208 moves the connection from the cache memory 210 to the reload calendar 228. Thereafter, step 622 is performed, in which the method 600 of FIG. 6 ends.

As described above in FIG. 5 during a scheduling opportunity, the dequeue control logic 218 may select and service a connection from the cache memory 210. Connections may also be scheduled for servicing in the cache memory 210 during the same scheduling opportunity. As described above in FIG. 6, the enqueue control logic 208 may schedule connections for servicing in the cache memory 210. The reload control logic 226 also may schedule connections for servicing in the cache memory 210. More specifically, the reload control logic 226 may find one or more control blocks corresponding connections in the reload calendar 228 that are scheduled for servicing in the near future (e.g., within one or two scheduling opportunities), read the control blocks corresponding to the connections from the memory 202, and store (e.g., schedule for servicing) the control blocks corresponding to the connections in the cache memory 210. In this manner, when necessary, control blocks corresponding to connections that are scheduled for servicing in the near future (e.g., in a reload calendar 228) may be retrieved from the memory 202 and scheduled in the cache memory 210 before the scheduling opportunity in which they are scheduled for servicing. Therefore, during the scheduling opportunity in which the connection is serviced, the scheduler logic 204 may locally access the control block corresponding to the connection.

Connections (e.g., control blocks corresponding to the connections) currently scheduled for servicing in the cache memory 210 may be removed from the cache memory 210 before they are serviced to make room for other connections which must be serviced before one or more of the connections currently scheduled in the cache memory 210. The cache memory 210 may use a replacement policy, such as a least recently used policy, to remove the connections. As mentioned above, a connection is scheduled for servicing based on a next service time value included in the control block corresponding to the connection. The cache memory 210 may provide the removed entry (e.g., connection) to the reload control logic 226 via the evict control logic 224. The reload control logic 226 may schedule the removed connection in reload calendar 228 based on the next service time of connection.

Through the use of the methods of FIGS. 3 and 4, connections are scheduled to be serviced while limiting the number of times a memory (e.g., an external memory) is accessed to retrieve control structures corresponding to the connections.

The foregoing description discloses only exemplary embodiments of the invention. Modifications of the above-disclosed embodiments of the present invention which fall within the scope of the invention will be readily apparent to those of ordinary skill in the art. For instance, while the present embodiments of the invention disclose storing one or more portions of a control block corresponding to a connection in different sections (e.g., time stamp CAM 212, flow id CAM 214, and flow control block RAM 216) of the cache memory 210, in other embodiments, the entire control block may be stored as an entry in one section of the cache memory 210. Further, while in one or more embodiments, the reload control logic 226, enqueue control logic 208 and the evict control logic 224 are coupled directly to the memory interface 206, in other embodiments, the reload control logic 226, enqueue control logic 208, and the evict control logic 224 may each be coupled to the memory interface 206 via control logic that keeps track of a large number of operations to the memory interface and provides efficient usage of memory bandwidth. A larger or smaller maximum number of cache entries than described may be used. Further, in addition to servicing one connection during a scheduling opportunity, in other embodiments, multiple connections may be serviced during the scheduling opportunity.

Accordingly, while the present invention has been disclosed in connection with exemplary embodiments thereof, it should be understood that other embodiments may fall within the spirit and scope of the invention as defined by the following claims.

The invention claimed is:

1. A method of scheduling connections for a network processor comprising:

in a cache memory, scheduling a plurality of connections to be serviced based on quality of service parameters stored in a control structure corresponding to each connection includes:
receiving data from a first connection;
determining whether an entry for a control structure corresponding to the first connection is included in one of the cache memory and an external memory;
accessing one or more portions of the control structure;
calculating a service time when the first connection is to be serviced, the service time being based on the quality of service parameters;
determining whether to schedule the first connection to be serviced in one of the cache memory and a calendar based on the service time; and
if it is determined to schedule the first connection in the cache memory, in the cache memory, scheduling the first connection to be serviced based on quality of service parameters stored in the control structure corresponding to the first connection; and
during a scheduling opportunity:
identifying one or more of the plurality of connections in the cache memory to be serviced;
selecting one of the connections identified to be serviced;
servicing the selected connection;
accessing one or more portions of the control structure, including the quality of service parameters, in the cache memory, the quality of service parameters corresponding to the selected connection;
calculating a next service time when the selected connection is to be serviced, the next service time being based on the quality of service parameters; and
determining whether to schedule the selected connection to be serviced in one of the cache memory and a calendar based on the next service time.

2. A method of scheduling connections for a network processor comprising:
in a cache memory, scheduling a plurality of connections to be serviced based on quality of service parameters stored in a control structure corresponding to each connection; and
during a scheduling opportunity:
identifying one or more of the plurality of connections in the cache memory to be serviced including employing a key to identify one or more of the plurality of connections in the cache memory that include a service time that matches the key, the service time being based on the quality of service parameters;
selecting one of the connections identified to be serviced;
servicing the selected connection;
accessing one or more portions of the control structure, including the quality of service parameters, in the cache memory, the quality of service parameters corresponding to the selected connection;
calculating a next service time when the selected connection is to be serviced, the next service time being based on the quality of service parameters;
determining whether to schedule the selected connection to be serviced in one of the cache memory and a calendar based on the next service time; and
scheduling the selected connection to be serviced in the cache memory when a difference between the next service time and the key is approximately less than a predetermined number of scheduling opportunities.

3. A method of scheduling connections for a network processor comprising:
in a cache memory, scheduling a plurality of connections to be serviced based on quality of service parameters stored in a control structure corresponding to each connection; and
during a scheduling opportunity:
identifying one or more of the plurality of connections in the cache memory to be serviced including employing a key to identify one or more of the plurality of connections in the cache memory that include a service time that matches the key, the service time being based on the quality of service parameters;
selecting one of the connections identified to be serviced;
servicing the selected connection;
accessing one or more portions of the control structure, including the quality of service parameters, in the cache memory, the quality of service parameters corresponding to the selected connection;
calculating a next service time when the selected connection is to be serviced, the next service time being based on the quality of service parameters;
determining whether to schedule the selected connection to be serviced in one of the cache memory and a calendar based on the next service time; and
scheduling the selected connection to be serviced in the calendar when the difference between the next service time and the key is approximately greater or equal to than a predetermined number of scheduling opportunities.

4. An apparatus for scheduling connections for a network processor comprising:
an external memory; and
scheduler logic, having a cache memory and a calendar, coupled to the external memory, and adapted to:
in the cache memory, schedule a plurality of connections to be serviced based on quality of service parameters stored in a control structure corresponding to each connection;
during a scheduling opportunity:
identify one or more of the plurality of connections in the cache memory to be serviced;
select one of the connections identified to be serviced;
service the selected connection;
access one or more portions of the control structure, including the quality of service parameters, in the cache memory, the quality of service parameters corresponding to the selected connection;
calculate a next service time when the selected connection is to be serviced, the next service time being based on the quality of service parameters; and
determine whether to schedule the selected connection to be serviced in one of the cache memory and the calendar based on the next service time; and
wherein the scheduler logic is further adapted to:
receive data from a first connection;
determine whether an entry for a control structure corresponding to the first connection is included in one of the cache memory and the external memory;
access one or more portions of the control structure;
calculate a service time when the first connection is to be serviced, the service time being based on the quality of service parameters;

determine whether to schedule the first connection to be serviced, in one of the cache memory and the calendar based on the service time; and if it is determined to schedule the first connection in the cache memory, in the cache memory, schedule the first connection to be serviced based on quality of service parameters stored in the control structure corresponding to the first connection.

5. An apparatus for scheduling connections for a network processor comprising:

an external memory; and scheduler logic, having a cache memory and a calendar, coupled to the external memory, and adapted to:

in the cache memory, schedule a plurality of connections to be serviced based on quality of service parameters stored in a control structure corresponding to each connection;

during a scheduling opportunity:

identify one or more of the plurality of connections in the cache memory to be serviced;

select one of the connections identified to be serviced;

service the selected connection;

access one or more portions of the control structure, including the quality of service parameters, in the cache memory, the quality of service parameters corresponding to the selected connection;

calculate a next service time when the selected connection is to be serviced, the next service time being based on the quality of service parameters; and determine whether to schedule the selected connection to be serviced in one of the cache memory and the calendar based on the next service time;

employ a key to identify one or more of the plurality of connections in the cache memory that include a service time that matches the key, the service time being based on the quality of service parameters; and wherein the scheduler logic is further adapted to schedule the selected connection to be serviced in the cache memory when a difference between a next service time and the key time is approximately less than a predetermined number of scheduling opportunities.

6. An apparatus for scheduling connections for a network processor comprising:

an external memory; and scheduler logic, having a cache memory and a calendar, coupled to the external memory, and adapted to:

in the cache memory, schedule a plurality of connections to be serviced based on quality of service parameters stored in a control structure corresponding to each connection;

during a scheduling opportunity:

identify one or more of the plurality of connections in the cache memory to be serviced;

select one of the connections identified to be serviced;

service the selected connection;

access one or more portions of the control structure, including the quality of service parameters, in the cache memory, the quality of service parameters corresponding to the selected connection;

calculate a next service time when the selected connection is to be serviced, the next service time being based on the quality of service parameters; and determine whether to schedule the selected connection to be serviced in one of the cache memory and the calendar based on the next service time;

employ a key to identify one or more of the plurality of connections in the cache memory that include a service time that matches the key, the service time being based on the quality of service parameters; and wherein the scheduler logic is further adapted to schedule the selected connection to be serviced in the calendar when a difference between a next service time and the key is approximately greater than or equal to a predetermined number of scheduling opportunities.

7. An apparatus for scheduling connections for a network processor comprising:

an external memory; and scheduler logic, having a cache memory and a calendar, coupled to the external memory, and adapted to:

in the cache memory, schedule a plurality of connections to be serviced based on quality of service parameters stored in a control structure corresponding to each connection; and during a scheduling opportunity:

identify one or more of the plurality of connections in the cache memory to be serviced;

select one of the connections identified to be serviced;

service the selected connection;

access one or more portions of the control structure, including the quality of service parameters, in the cache memory, the quality of service parameters corresponding to the selected connection;

calculate a next service time when the selected connection is to be serviced, the next service time being based on the quality of service parameters; and determine whether to schedule the selected connection to be serviced in one of the cache memory and the calendar based on the next service time; and wherein the scheduler logic comprises:

reload control logic coupled to the cache memory, reload calendar, external memory, and evict control logic, and adapted to:

schedule one or more portions of a control structure corresponding to a connection to be serviced in the reload calendar;

retrieve one or more portions of the control structure corresponding to the connection to be serviced from the reload calendar; and schedule the one or more portions of the retrieved control structure corresponding to a connection to be serviced in the cache memory;

enqueue control logic coupled to the cache memory, and the external memory, and adapted to schedule one or more portions of the control structure corresponding to the connection to be serviced in the cache memory;

dequeue control logic coupled to the cache memory, and adapted to:

identify one or more of a plurality of connections in the cache memory to be serviced;

select one of the connections identified to be serviced; and service the selected connection; and evict control logic coupled to the cache memory and the external memory, and adapted to:

receive one or more portions of the control structure corresponding to the connection that was scheduled in the cache memory; and determine whether to output the one or more portions of the control structure to one of the external memory and the reload control logic.

8. The apparatus of claim 7 wherein the cache memory includes:

a time stamp contents addressable memory;

a flow id contents addressable memory; and a flow control block memory;

wherein the time stamp contents addressable memory, flow id contents addressable memory and the flow control block memory are such adapted to store one or more portions of each cache memory entry.

* * * * *